March 14, 1944. S. BEHAR 2,344,227
JUICER SUPPORT
Original Filed Oct. 6, 1938 2 Sheets-Sheet 1

Sam Behar, INVENTOR.
BY
His Attorney

March 14, 1944.  S. BEHAR  2,344,227
JUICER SUPPORT
Original Filed Oct. 6, 1938   2 Sheets-Sheet 2

Sam Behar, INVENTOR
His Attorney

Patented Mar. 14, 1944

2,344,227

UNITED STATES PATENT OFFICE 2,344,227

JUICER SUPPORT

Sam Behar, Berwyn, Ill., assignor to A. F. Dormeyer Mfg. Co., a corporation of Illinois Original application October 6, 1938, Serial No. 233,541. Divided and this application July 12, 1941, Serial No. 402,203. In Canada June 10, 1940

5 Claims. (Cl. 146—3)

The present invention relates to food mixers, and is partcularly concerned with electric food mixers of the household type which are also adapted to drive a multiplicity of other food working attachments.

This application is a division of my application, Serial No. 233,541, filed October 6, 1938 for Electric food mixers, reference to which is hereby made for a fuller understanding of the general construction of the food mixer.

An object of the invention is the provision of an improved electric driving unit for food-working devices, in which the various driving shafts are adapted to be driven at the best speed for the work to which they are applied, so that it is unnecessary to use any detachable speed-reducing gear arrangements.

Other objects and advantages of the invention will be apparent from the following description and the accompanying drawings, in which similar characters of reference indicate similar parts throughout the several views.

Referring now to the drawings in which.

Figure 1:
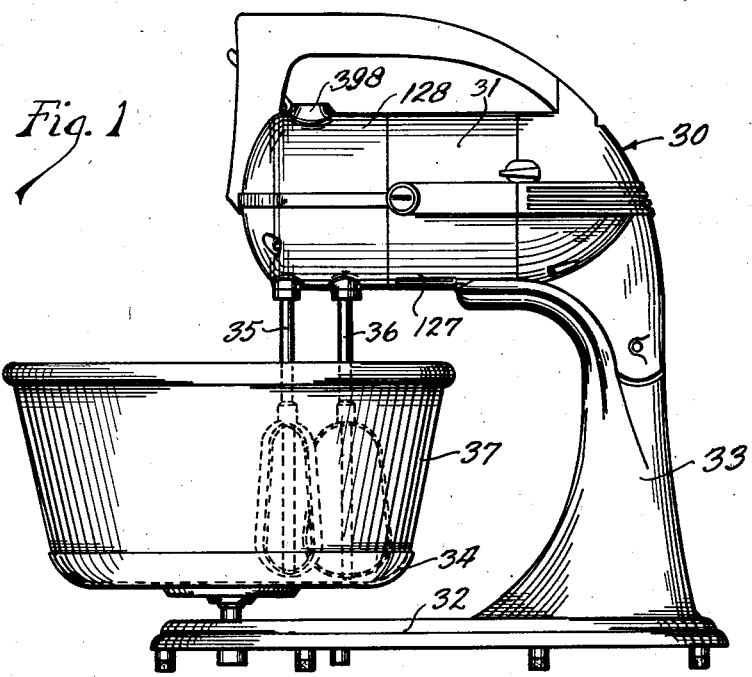
Fig. 1 is a side elevational view of an electric food mixer of the household type embodying the invention, with the mixer in the mixing position on the standard.
Figure 3:
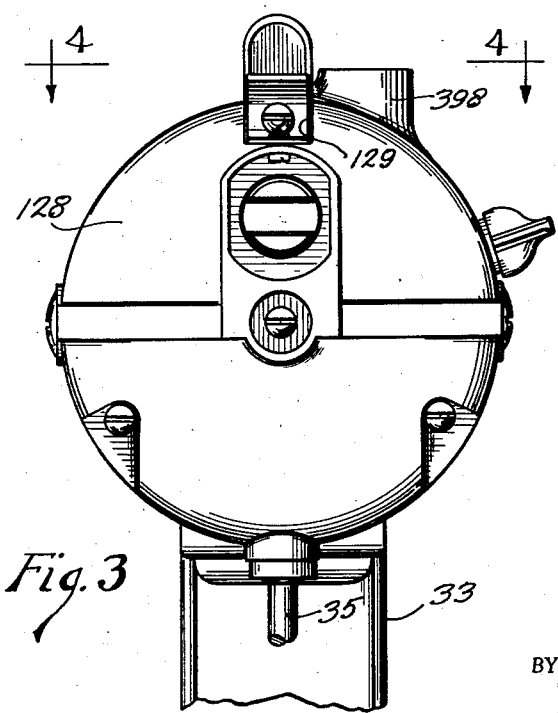
Fig. 3 is a front elevational view of Fig. 1 with handle removed.
Figure 4:
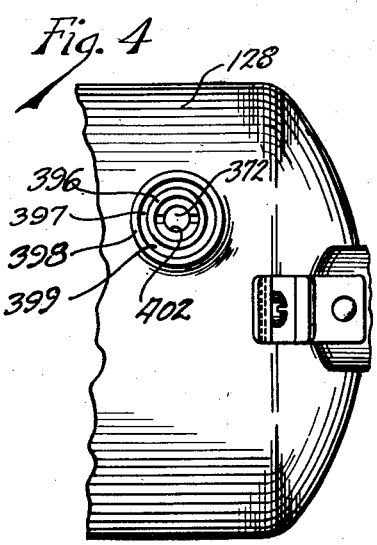
Fig. 4 is a section taken on the line 4—4 of Fig. 3.

Referring to Fig. 1, the electric food mixer, which is indicated in its entirety by the numeral 30, preferably comprises an electric motor driving unit 31, a base 32 having a standard 33, turntable 34, beater elements 35, 36 and bowl 37.

The base 32 and standard 33 may be constructed of two separate cast metal pieces, the standard 33 being hollow and secured to the base by a plurality of screws (not shown) passing through the base and threaded into the standard 33.

A partition 185 between the middle or main housing 127 and the gear housing 128 is provided with a substantially cylindrical boss 198 for receiving the main bearing 199. The motor shaft (not shown) is provided with a worm or screw thread 370 adapted to mesh with a worm gear 371 carried by a juicer drive shaft 372.

Figure 2:
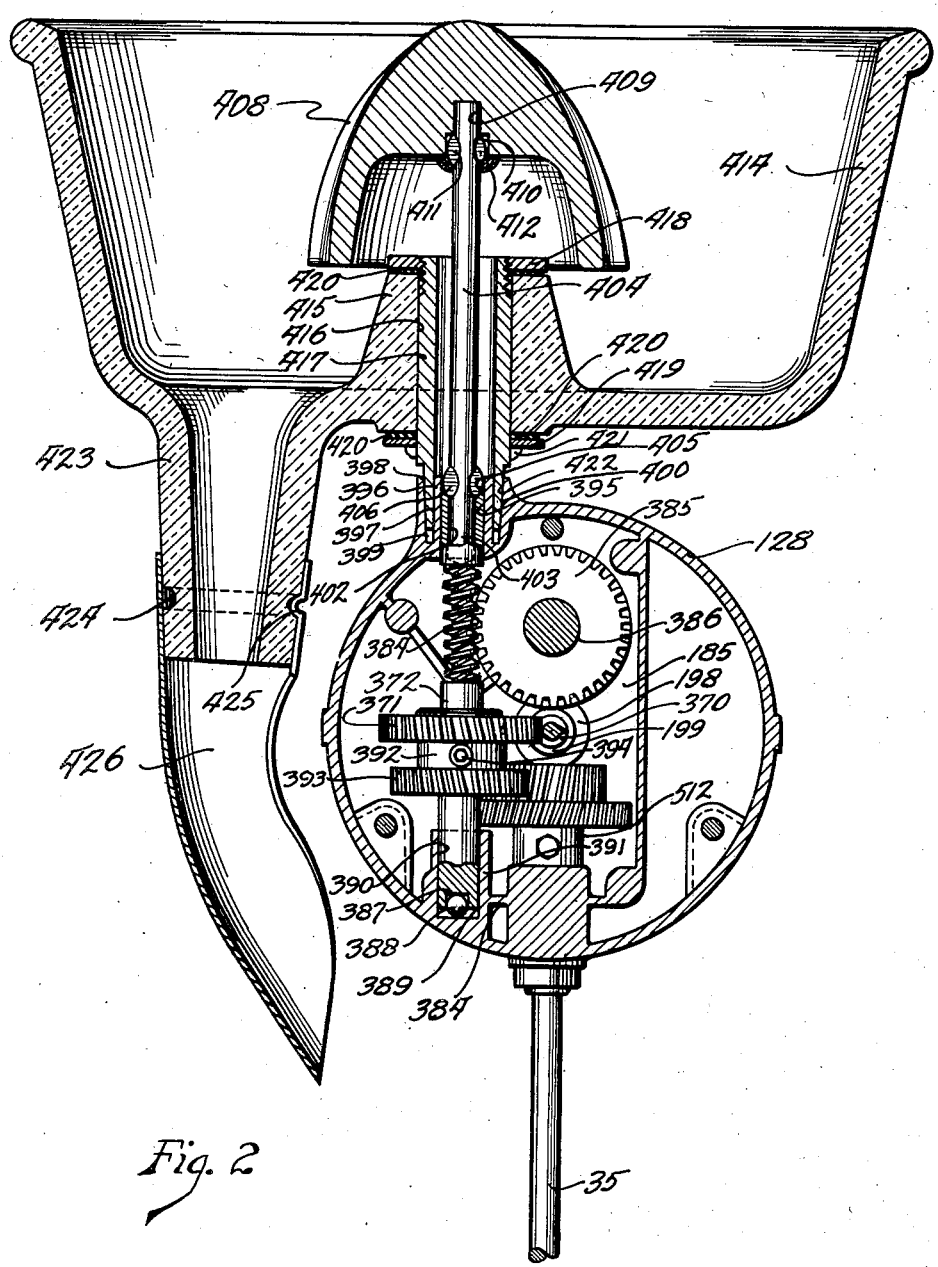
Fig. 2 is a vertical sectional view through the driving unit, with the citrus fruit juicer applied to the driving unit.

The juicer shaft 372 may comprise a substantially cylindrical shaft, provided with a worm or screw 384 for meshing with the gear 385 (Fig. 2) carried by the power takeoff shaft 386.

The juicer shaft is provided at its lower end with a cylindrical recess 387 for receiving a steel ball 388 which is retained in place by riveting over the bore 387 at 389. The lower end of shaft 372 is rotatably mounted in a cylindrical bore 390 formed in an integral bearing lug 391, and the ball 388 serves as a thrust bearing for the worm 384, which is so arranged that it has a downward thrust upon it.

The worm gear 371 may consist of a toothed fiber annulus, which is pressed fitted on the brass hub 392 of the helical spur gear 393, formed integrally with the lug 392. Gears 371 and 393 are both secured in place on the shaft 382 by a set screw 394.

The upper end of the juicer shaft 372 is rotatably mounted in a cylindrical bore or bearing 395 formed in a tubular portion 396 of the gear housing. The tubular portion 396 is preferably cylindrical at its external surface 397, and it is surrounded by an internally tapered second tubular flange 398, thereby leaving a tapering annular space 399 for receiving the externally tapered tubular supporting member 400 of the juicer bowl 401.

The upper end of the juicer shaft 372 is provided with a cylindrical bore 402 for receiving the complementary end portion 403 of a reamer shaft 404. Oppositely located axially extending slots 405 are provided at the upper end of juicer shaft 372 for receiving the pressed radial flanges 406 carried by the reamer shaft 404.

The reamer 407 may be constructed of beetle ware or of porcelain, and it is a substantially half egg-shaped member provided with a plurality of radially extending ribs 408 on its outer surface. The ribs extend in substantially the direction of the reamer shaft 404, and the reamer is provided with an aperture 409, and with slots 410 for receiving the upper end of reamer shaft 404 and receiving the radial ribs 411.

The reamer is secured to the end of the reamer shaft 404 by cement 412 or other suitable means.

The juicer bowl 401 may consist of a bowl of glass ware or porcelain or other suitable molded material, such as a phenolic condensation compound, having a bottom 413 bordered by an upwardly extending border flange 414 and provided with a centrally located tubular formation 415 projecting above any possible level of juice in the bowl and preventing the leakage of juice along the reamer shaft 404.

The tubular formation 415 has a centrally located bore 416 adapted to receive a metal sleeve 417, the upper threaded end of which is provided with an annular nut 418. At its lower end, just below the bowl, the sleeve 417 supports a metal washer member 419 and rubber gaskets 420 may be interposed between the washer 419 and the hub 415 of the bowl and between the hub 415 and the nut 418.

The sleeve 417 may have pressed deformations projecting radially from its surface below the washer 419, serving as retaining shoulders, and thus the hub 415 of the bowl may be clamped between the washer 419 and nut 418, the washer 419 engaging the lugs 421. The sleeve 417 is provided with a relatively thin, tapered end portion 422 adapted to be received in the annular space 399 between the tubular member 398 and 396 on the gear housing.

The sleeve portion 422, being tapered, the bowl may thus be supported on the gear housing of the motor by placing the tapered portion 422 in the recess 399. Since both walls of the annular recess 399 and the inside and outside of sleeve 400 are frustoconical the sleeve may be fixedly secured by being wedged into the recess. Thereafter the reamer shaft 404 may be inserted and rotated until its flanges 406 register with the slots 405, and thus the reamer is in position to be driven by the juicer shaft 372.

The bowl 401 is preferably provided with a depending integral tubular discharge spout 423 having formed therein an exterior peripheral groove 424 for receiving the inwardly pressed lugs or rib 425 carried by a curved sheet metal spout 426. By means of the curved sheet metal spout the juice may be directed in various directions, as the spout 426 may be turned on the bowl spout 423 to change the direction of discharge of the juice.

The present driving unit is adapted to be used for driving all sorts of food attachments at the ideal speed for each attachment, and it is not necessary to provide auxiliary and separate gear housings, which may become lost, and which involve considerable difficulty and delay in their attachment to the motor driver.

The various food attachments are quickly and easily attachable and detachable with a minimum number of movements of the operator, so that the work of utilizing these attachments does not become onerous, as may be the case with many of the devices of the prior art. When the difficulty and labor of using a food attachment is particularly onerous, the tendency is for the user of the food-working machine to dispense with the attachment, but the present attachments may be so easily applied that the usefulness of the food mixer is greatly enhanced thereby.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an electric juicer, the combination of a motor driving unit comprising a housing having a motor and speed reduction gearing, with an upwardly projecting juicer drive shaft exposed at an opening in the upper side of said housing, said opening having an inwardly extending annular groove tapered in width and adapted to receive a tapered sleeve, a juicer bowl having a centrally located hub carried by said tapered sleeve, and having a depending discharge spout, said juicer bowl being supported by said tapered sleeve in said annular groove.

2. In a food mixer, a motor driving unit comprising a housing having a motor and speed reduction gearing, an upwardly projecting juicer drive shaft driven by said gearing and exposed at an opening in the upper side of said housing, said opening having radially spaced flanges defining an inwardly extending and annular space adapted to receive a tapered sleeve supporting a juicer bowl, the inner flange providing a journal for the juicer drive shaft and being coextensive therewith.

3. In a food mixer, a motor driving unit comprising a housing having a motor and speed reduction gearing, a vertically disposed juicer drive shaft driven by said gearing and exposed at an opening in the upper side of said housing, said opening being bounded by tubular flanges defining an inwardly extending annular space tapering in width, a bowl having a drain opening and an upwardly extending boss having an aperture therein, a sleeve member mounted in said aperture and secured in place in bowl supporting relationship with a lower end of the sleeve extending below the bowl, said lower end tapering at its end to mate with and be received in said annular groove, reamer means extending through said sleeve to engage said drive shaft in detachable driven relationship.

4. In a food mixer, a motor driving unit comprising a housing enclosing speed reduction gearing, an upwardly projecting juicer drive shaft driven by said gearing and exposed at an opening in the upper side of the housing, a detachable driven shaft for rotating a reamer, a socket element upon one shaft and a male element upon the other shaft adapted to engage the socket element in rotary drive relationship, a flange bounding said opening and journalling the drive shaft, said drive shaft and flange being substantially coextensive, an annular recess around said flange tapering downwardly and bounded upon one side by a conical wall, a sleeve supporting a juicer bowl adapted to be received in said recess and having a tapering wall mating with the conical wall to center the sleeve and flange and dispose the shafts in axial alignment.

5. In a food mixer, a motor driving unit comprising a housing having a motor and speed reduction gearing, an upwardly projecting juicer drive shaft driven by said gearing and exposed at an opening in the upper side of said housing, means for supporting a juicer bowl, means defining said opening and adapted to receive and support said means for supporting the juicer bowl, one of said means comprising radially spaced coaxial flanges defining an inwardly extending and annular space, and the other of said means comprising a tapered sleeve adapted to enter said annular space, said means defining said opening being coextensive with said drive shaft.

SAM BEHAR.